(12) United States Patent
Jaquette et al.

(10) Patent No.: US 11,930,099 B2
(45) Date of Patent: *Mar. 12, 2024

(54) IMPLEMENTING RESILIENT DETERMINISTIC ENCRYPTION

(71) Applicant: International Business Machines Corporation, Armonk, NY (US)

(72) Inventors: Glen Alan Jaquette, Tucson, AZ (US); Danny Harnik, Tel Mond (IL); William J. Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,820

(22) Filed: Mar. 30, 2023

(65) Prior Publication Data

US 2023/0291542 A1    Sep. 14, 2023

Related U.S. Application Data

(63) Continuation of application No. 17/114,058, filed on Dec. 7, 2020, now Pat. No. 11,695,541.

(51) Int. Cl.
*H04L 9/06*      (2006.01)
*H04L 9/32*      (2006.01)
*H04L 9/40*      (2022.01)

(52) U.S. Cl.
CPC .......... *H04L 9/0618* (2013.01); *H04L 9/0643* (2013.01); *H04L 9/3236* (2013.01); *H04L 63/0428* (2013.01); *H04L 2209/24* (2013.01)

(58) Field of Classification Search
CPC ... H04L 9/3242; H04L 9/3236; H04L 9/0637; H04L 9/0618; H04L 9/0643; H04L 63/0428; H04L 2209/30; H04L 2209/20; H04L 2209/24

USPC .......................................................... 380/28
See application file for complete search history.

(56) References Cited

U.S. PATENT DOCUMENTS

| | | | |
|---|---|---|---|
| 5,778,395 | A  | 7/1998 | Whiting et al. |
| 6,983,365 | B1 | 1/2006 | Douceur et al. |
| 7,266,689 | B2 | 9/2007 | Douceur et al. |
| 7,406,595 | B1 | 7/2008 | Boyle, Jr. et al. |
| 8,218,759 | B2 | 7/2012 | Moffat et al. |
| 8,259,934 | B2 | 9/2012 | Karroumi et al. |

(Continued)

FOREIGN PATENT DOCUMENTS

| | | |
|---|---|---|
| CN | 104303452 A | 1/2015 |
| CN | 108200172 A | 6/2018 |

OTHER PUBLICATIONS

Wikipedia, "Convergent encryption," Wikipedia, 2020, 2 pages, retrieved from https://en.wikipedia.org/wiki/Convergent_encryption.

(Continued)

*Primary Examiner* — Amare F Tabor
(74) *Attorney, Agent, or Firm* — Zilka-Kotab, P.C.

(57) ABSTRACT

A computer-implemented method according to one aspect includes creating an initialization vector, utilizing an instance of plaintext and a secret key; encrypting the instance of plaintext, utilizing the initialization vector, the secret key, and the instance of plaintext; combining the initialization vector and the encrypted instance of plaintext to create a ciphertext string; and outputting the ciphertext string.

25 Claims, 7 Drawing Sheets

(56) References Cited

U.S. PATENT DOCUMENTS

| | | | |
|---|---|---|---|
| 8,634,549 B2 | 1/2014 | Schneider | |
| 9,344,274 B2* | 5/2016 | Onoda | H04L 9/0618 |
| 9,407,437 B1 | 8/2016 | Campagna | |
| 9,419,791 B2* | 8/2016 | Naito | H04L 9/0637 |
| 9,635,011 B1 | 4/2017 | Wu et al. | |
| 9,673,983 B2* | 6/2017 | Jacobson | H04W 12/02 |
| 10,044,509 B1 | 8/2018 | Kirshner | |
| 10,148,424 B2* | 12/2018 | Iyer | H04L 9/0618 |
| 10,348,486 B2 | 7/2019 | Karame | |
| 10,972,270 B2* | 4/2021 | Campagna | H04L 9/0816 |
| 11,601,257 B2* | 3/2023 | Jaquette | H04L 9/065 |
| 11,695,541 B2 | 7/2023 | Jaquette et al. | |
| 2017/0134160 A1 | 5/2017 | Onoda | |
| 2018/0176014 A1 | 6/2018 | Campagna | |
| 2018/0191492 A1 | 7/2018 | Barham et al. | |
| 2020/0213109 A1 | 7/2020 | Perlman et al. | |
| 2021/0367771 A1* | 11/2021 | Gray | H04L 9/0894 |
| 2021/0377016 A1 | 12/2021 | Perlman et al. | |
| 2022/0182217 A1 | 6/2022 | Jaquette et al. | |
| 2022/0182242 A1* | 6/2022 | Jaquette | H04L 9/0618 |

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

U.S. Appl. No. 16/540,088, filed Aug. 14, 2019.

U.S. Appl. No. 16/199,268, filed Nov. 26, 2018.

Harkins, D., "Synthetic Initialization Vector (SIV) Authenticated Encryption Using the Advanced Encryption Standard (AES)," Aruba Networks, Oct. 2008, 27 pages, retrieved from https://tools.ietf.org/html/rfc5297.

Jaquette et al., U.S. Appl. No. 17/114,058, filed Dec. 7, 2020.

International Search Report and Written Opinion from PCT Application No. PCT/CN2021/128720, dated Jan. 24, 2021.

Non-Final Office Action from U.S. Appl. No. 17/114,058, dated Apr. 28, 2022.

Final Office Action from U.S. Appl. No. 17/114,058, dated Aug. 15, 2022.

Notice of Allowance from U.S. Appl. No. 17/114,058, dated Feb. 23, 2023.

IBM, List of IBM Patents Or Patent Applications Treated As Related, dated Apr. 12, 2023, 2 pages.

Supplemental Notice of Allowance from U.S. Appl. No. 17/114,058, dated May 1, 2023.

* cited by examiner

IMPLEMENTING RESILIENT DETERMINISTIC ENCRYPTION

BACKGROUND

The present invention relates to data encryption, and more particularly, this invention relates to implementing deterministic encryption of data that facilitates data deduplication.

Deterministic encryption is useful in data storage in that it allows duplicates of encrypted data to be identified and removed within such data storage. Length Preserving Compression (LPC) is a concept that enables a storage system to perform data deduplication of data that was already persistently encrypted at the host. However, current approaches to LPC implementation result in a system which can be circumvented by known methods. An improved deterministic encryption solution is therefore desired that avoids such circumvention.

BRIEF SUMMARY

A computer-implemented method according to one aspect includes creating an initialization vector, utilizing an instance of plaintext and a secret key; encrypting the instance of plaintext, utilizing the initialization vector, the secret key, and the instance of plaintext; combining the initialization vector and the encrypted instance of plaintext to create a ciphertext string; and outputting the ciphertext string.

According to another aspect, the initialization vector is added as metadata to the encrypted instance of plaintext.

According to another aspect, the initialization vector and the encrypted instance of plaintext are combined into a single data chunk that is parsed upon performing a read operation.

In this way, a fully deterministic ciphertext string may be created and stored for the instance of data, and since both the initialization vector and the encrypted instance of plaintext are calculated with a secret key, security vulnerability is avoided.

According to another aspect, a computer program product for implementing resilient deterministic encryption includes a computer readable storage medium having program instructions embodied therewith, where the program instructions are executable by a processor to cause the processor to perform a method including creating, by the processor, an initialization vector, utilizing an instance of plaintext and a secret key; encrypting, by the processor, the instance of plaintext, utilizing the initialization vector, the secret key, and the instance of plaintext; combining, by the processor, the initialization vector and the encrypted instance of plaintext to create a ciphertext string; and outputting, by the processor, the ciphertext string.

According to another aspect, a system includes a processor; and logic integrated with the processor, executable by the processor, or integrated with and executable by the processor, where the logic is configured to create an initialization vector, utilizing an instance of plaintext and a secret key; encrypt the instance of plaintext, utilizing the initialization vector, the secret key, and the instance of plaintext; combine the initialization vector and the encrypted instance of plaintext to create a ciphertext string; and output the ciphertext string.

According to another aspect, a computer-implemented method includes analyzing a plurality of ciphertext strings in data storage. Each of the ciphertext strings is created by combining an initialization vector and an encrypted instance of plaintext, the encrypted instance of plaintext is encrypted utilizing the initialization vector, a secret key, and an instance of plaintext, and the initialization vector is created utilizing the instance of plaintext and the secret key; and removing one or more redundant ciphertext strings from the data storage, based on the analyzing.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of implementing resilient deterministic encryption.

In one general aspect, a computer-implemented method includes creating an initialization vector, utilizing an instance of plaintext and a secret key; encrypting the instance of plaintext, utilizing the initialization vector, the secret key, and the instance of plaintext; combining the initialization vector and the encrypted instance of plaintext to create a ciphertext string; and sending the ciphertext string to a storage device performing deduplication.

In another general aspect, the initialization vector is added as metadata to the encrypted instance of plaintext.

In another general aspect, the initialization vector and the encrypted instance of plaintext are combined into a single data chunk that is parsed upon performing a read operation.

In this way, a fully deterministic ciphertext string may be created and stored for the instance of data, and since both the initialization vector and the encrypted instance of plaintext are calculated with a secret key, security vulnerability is avoided.

In another general aspect, a computer program product for implementing resilient deterministic encryption includes a computer readable storage medium having program instructions embodied therewith, where the computer readable storage medium is not a transitory signal per se, and where the program instructions are executable by a processor to cause the processor to perform a method including creating, by the processor, an initialization vector, utilizing an instance of plaintext and a secret key; encrypting, by the processor, the instance of plaintext, utilizing the initialization vector, the secret key, and the instance of plaintext; combining, by the processor, the initialization vector and the encrypted instance of plaintext to create a ciphertext string; and sending, by the processor, the ciphertext string to a storage device performing deduplication.

In another general aspect, a system includes a processor; and logic integrated with the processor, executable by the processor, or integrated with and executable by the processor, where the logic is configured to create an initialization vector, utilizing an instance of plaintext and a secret key; encrypt the instance of plaintext, utilizing the initialization vector, the secret key, and the instance of plaintext; combine the initialization vector and the encrypted instance of plaintext to create a ciphertext string; and send the ciphertext string to a storage device performing deduplication.

In another general aspect, a computer-implemented method includes analyzing a plurality of ciphertext strings in data storage, where each of the plurality of ciphertext strings are created by combining an initialization vector and an encrypted instance of plaintext, the encrypted instance of plaintext is encrypted utilizing the initialization vector, a secret key, and an instance of plaintext, and the initialization vector is created utilizing the instance of plaintext and the secret key; and removing one or more redundant ciphertext strings from the data storage, based on the analyzing.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
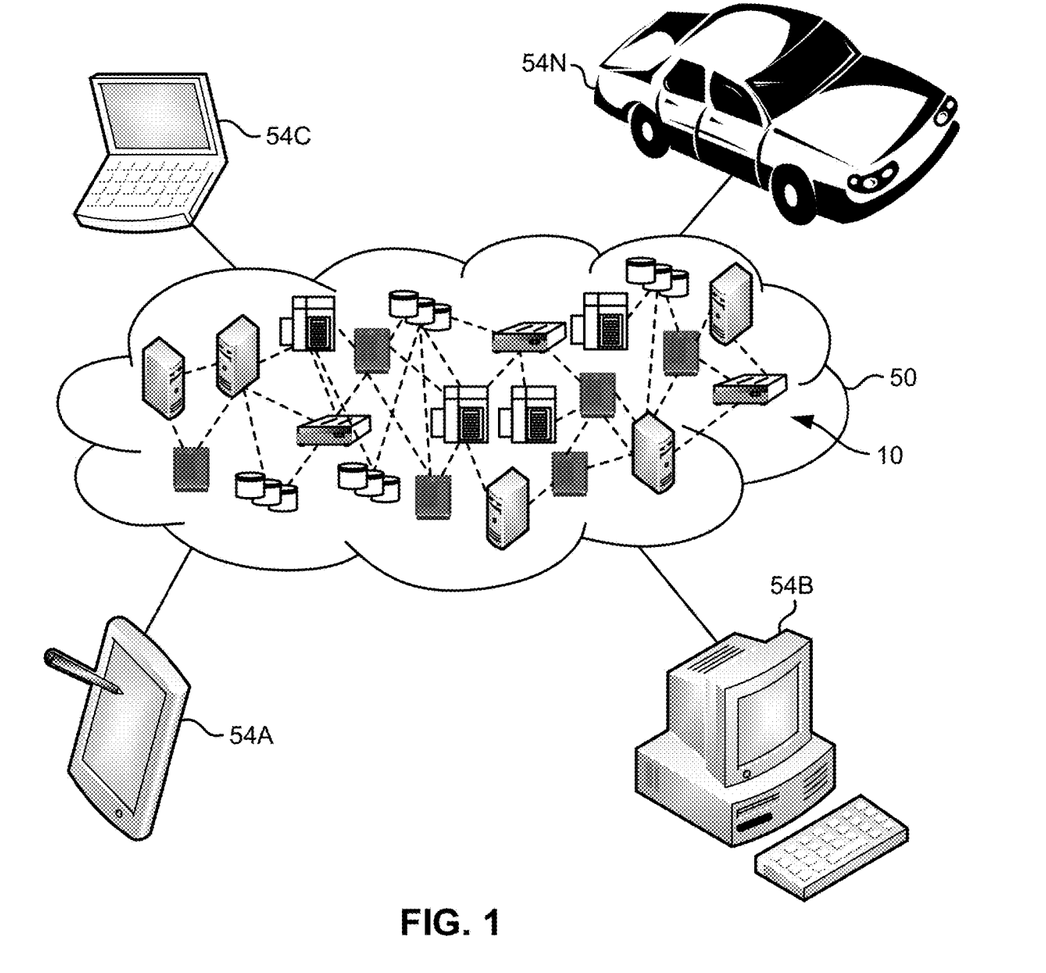
FIG. 1 depicts a cloud computing environment in accordance with one aspect of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
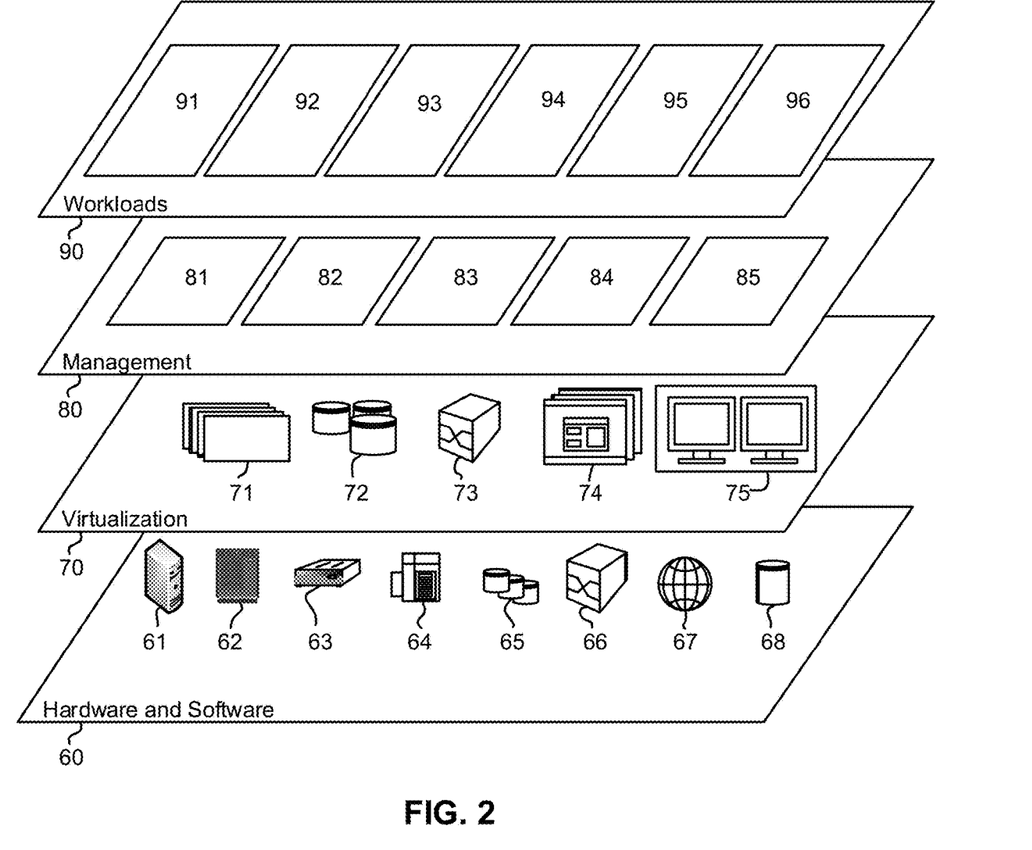
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption 96.

Figure 3:
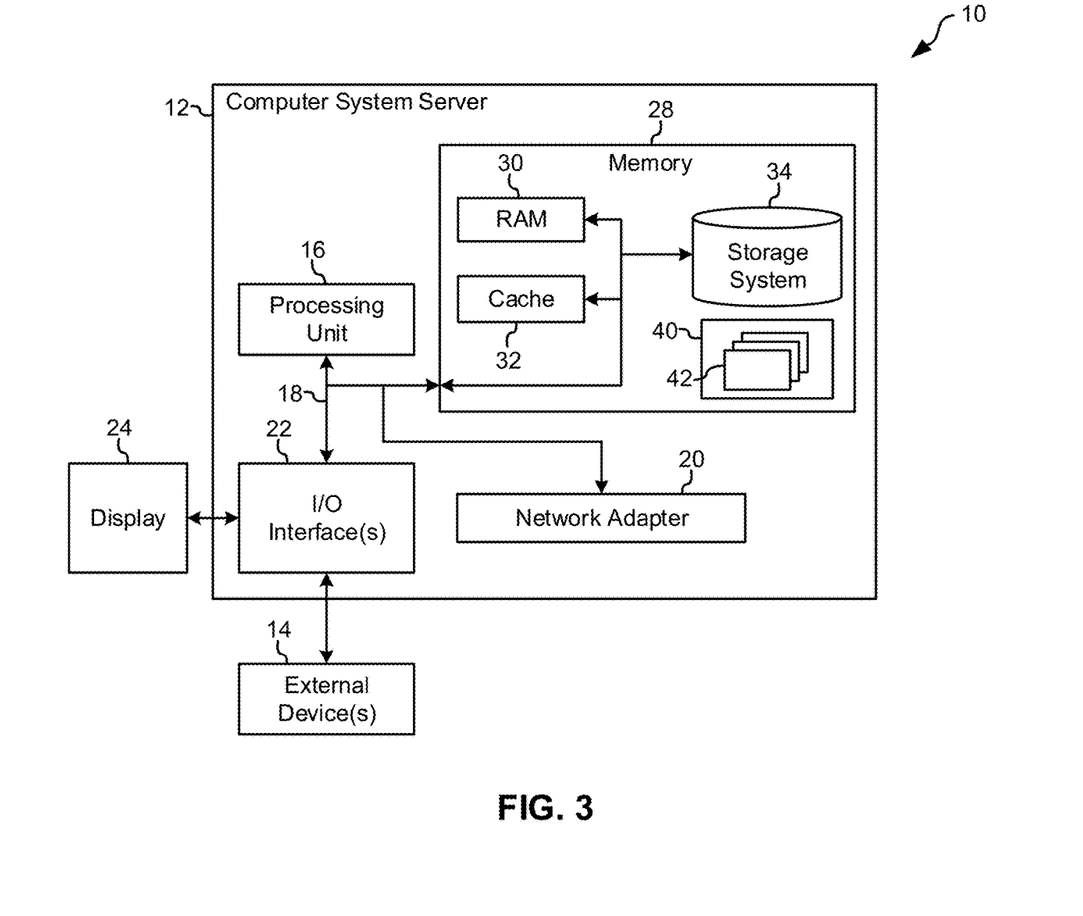
FIG. 3 depicts a cloud computing node in accordance with one aspect of the present invention.

Referring now to FIG. 3, a schematic of an example of a cloud computing node is shown. Cloud computing node 10 is only one example of a suitable cloud computing node and is not intended to suggest any limitation as to the scope of use or functionality of aspects of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of aspects of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of aspects of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
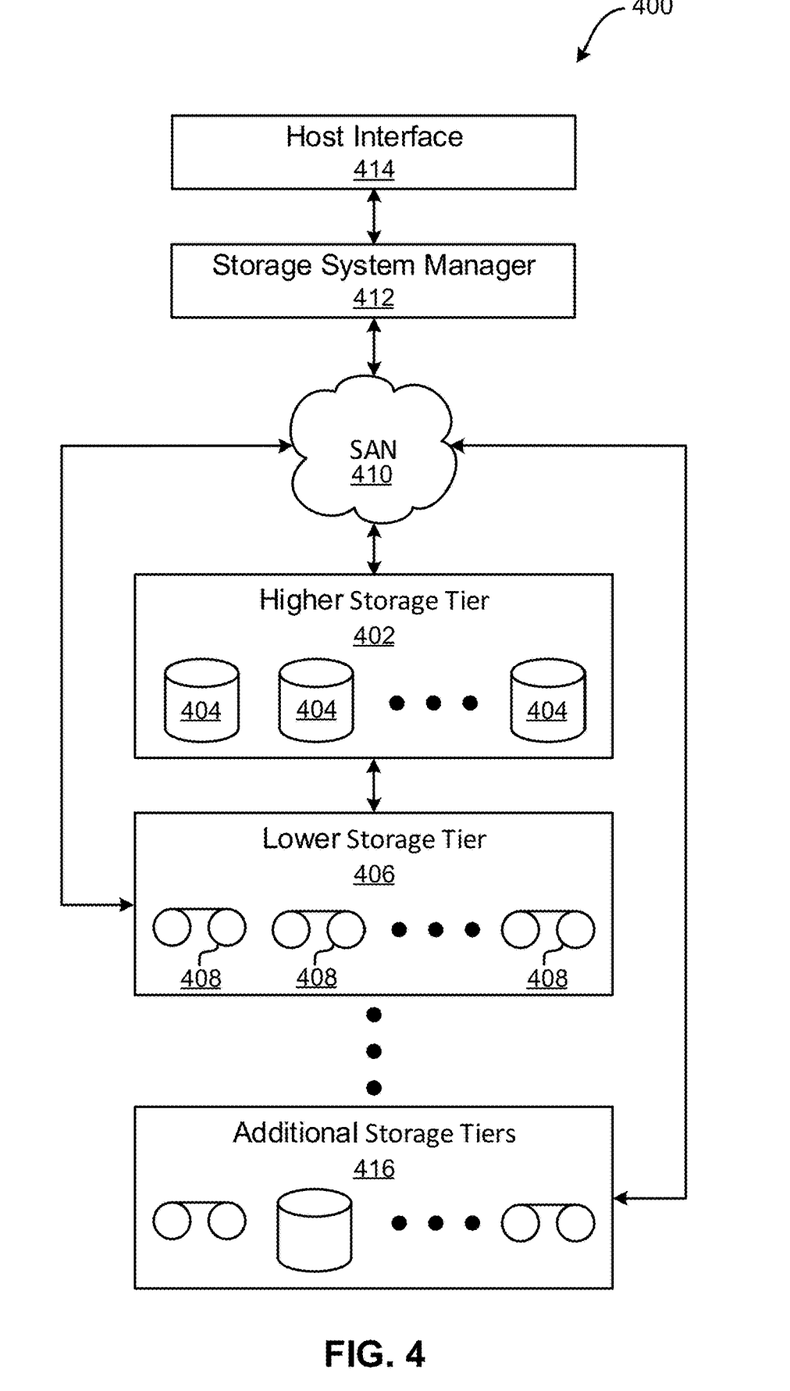
FIG. 4 illustrates a tiered data storage system in accordance with one aspect of the present invention.

Now referring to FIG. 4, a storage system 400 is shown according to one aspect. Note that some of the elements shown in FIG. 4 may be implemented as hardware and/or software, according to various aspects. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the aspects presented herein.

According to some aspects, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various aspects.

Figure 5:
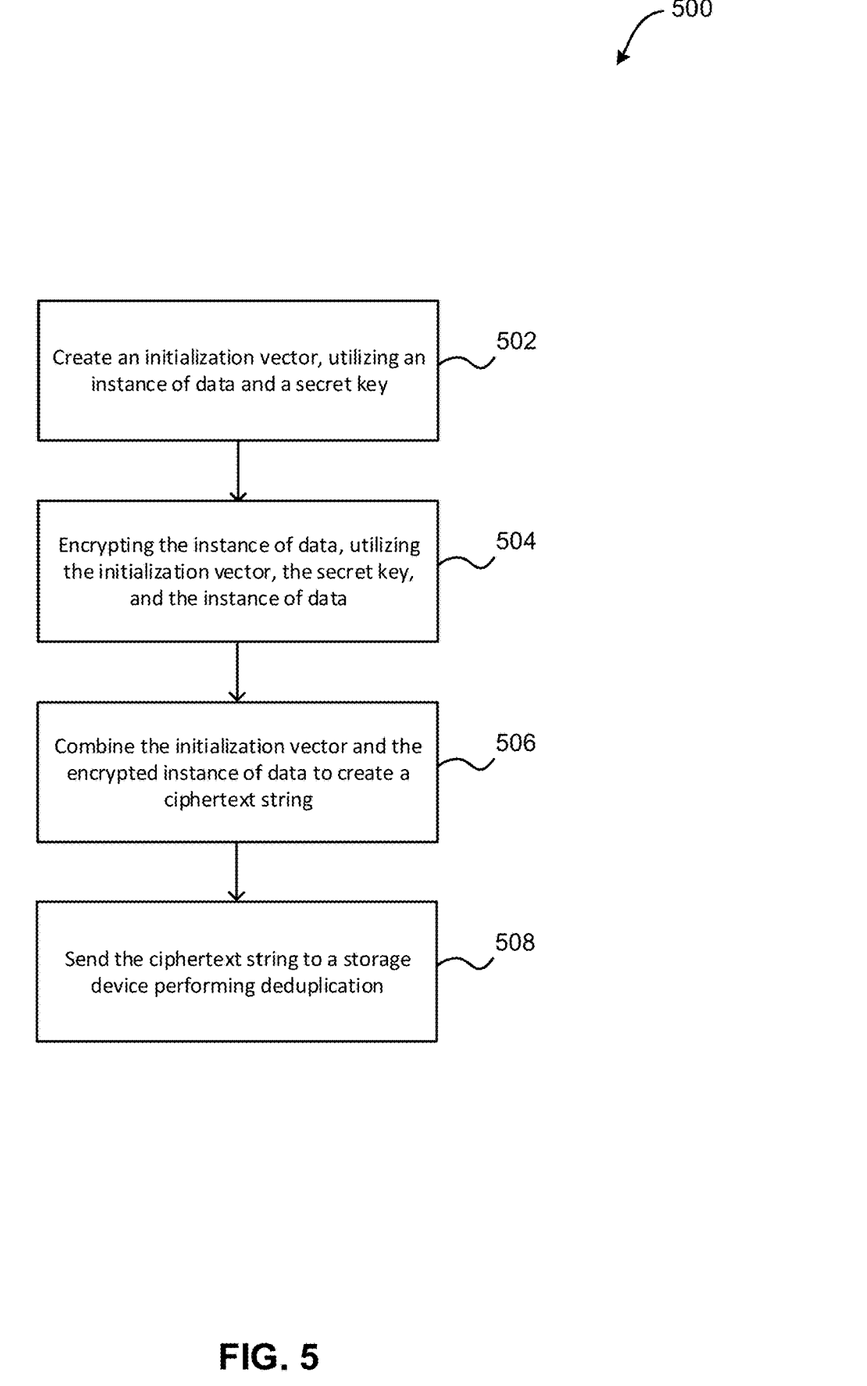
FIG. 5 illustrates a flowchart of a method for implementing resilient deterministic encryption, in accordance with one aspect of the present invention.

Now referring to FIG. 5, a flowchart of a method 500 is shown according to one aspect. The method 500 may be performed in accordance with the present invention in any of the environments depicted in FIGS. 1-4, among others, in various aspects. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art. Additional exemplary components include one or more co-processors or accelerators which may or may not be on the same chip, or packaged on the same substrate or module, as the CPU.

As shown in FIG. 5, method 500 may initiate with operation 502, where an initialization vector (IV) is created utilizing an instance of data and a secret key. In one aspect, the instance of data may include data to be encrypted. In another aspect, the instance of data may include an instance of plaintext.

Additionally, in one aspect, the instance of data may be compressed, and the IV may be calculated based on the compressed instance of data. In another aspect, the secret key may include information used for encryption that is not publicly available (e.g., that is held by an entity performing the encryption of the instance of data). In yet another aspect, the secret key may also be known as a private key.

Further, in one aspect, the IV may be all, or a subset of, a keyed hash. For example, the keyed hash may result from applying a cryptographic hash function to the secret key and the plaintext. In another example, the hash function may be applied to the secret key and the plaintext in any order (e.g., first to the secret key and then to the plaintext, or first to the plaintext and then to the secret key). In yet another example, the hash function may map the secret key and the plaintext to fixed-size hash values constituting the keyed hash. In one aspect, the hash function may include a type of secure hash algorithm-256 (SHA-256) cryptographic hash function such as SHA2-256 or SHA3-256.

Further still, in one aspect, the IV may include a keyed-hash message authentication code/hash-based message authentication code (HMAC) calculation involving a hashing key and the plaintext. In another aspect, the hashing key may be identical to the secret key used to encrypt the data, or may be associated with that secret key by key derivation (e.g., the hashing key may be derived from the secret key, or the secret key may be derived from the hashing key), and the keyed hash may be calculated using cryptographic hashing, or using an encryption algorithm, or by using a combination of hashing and encryption.

For example, the keyed hash may be determined by encrypting the hash of the plaintext with a hash-encrypting key. A hash-encrypting key is one type of hashing key and so may be identical to the secret key used to encrypt the data, or may be related to that secret key by key derivation. When using a hash-encrypting key, the encryption algorithm used could be as simple as electronic codebook (ECB) mode, of the advanced encryption standard (AES) encryption algorithm, using 128-bit keys (i.e., ECB-AES-128). In another aspect, the hashing key may also be generated independently of the secret key and if so, the hashing key would need to be kept such that it can be used, with the secret key, to perform further encryption under the same keys to allow data deduplication. An independently generated hashing key may contribute to the uniqueness of the IV. An independently generated hashing key would also have to be kept if the IV is to be checked as matching the plaintext result of a decryption of ciphertext created by use of that IV.

Also, method 500 may proceed with operation 504, where the instance of data is encrypted utilizing the IV, the secret key, and the instance of data. In one aspect, encrypting the instance of data may result in an encrypted instance of data (e.g., ciphertext, etc.). In another aspect, encrypting the instance of data may include applying an encryption mode (e.g., an encryption algorithm) to the instance of data, utilizing the IV and the secret key.

In addition, in one aspect, the encryption mode may include an encryption mode which depends on an IV or nonce such as CBC, PCBC, CFB, OFB, OCB, CTR, CCM, or GCM. For example, a counter-based encryption mode (e.g., CTR, GCM, etc.) may combine the IV with an arbitrary counter value to create a first value. That first value can then be incremented to create a count stream as long as required. Block cipher encryption (e.g., advanced encryption standard (AES) encryption, etc.) may then be performed on the count stream, utilizing the secret key, to create a cipherstream. The instance of data may then be combined with the cipherstream (e.g., using an exclusive OR (XOR) operation) to create the encrypted instance of data.

Furthermore, in one aspect, the encryption mode may include a Galois/counter mode (GCM) encryption mode. For example, a GCM encryption mode may determine a number of blocks within the instance of data. The number of blocks may be combined with the IV to create a first value. Block cipher encryption (e.g., advanced encryption standard (AES) encryption, etc.) may then be performed on the first value, utilizing the secret key, to create a second value. The instance of data may then be combined with the second value (e.g., using an XOR operation) to create the encrypted instance of data.

Further still, in one aspect, the encryption mode may include use of an IV with cipher block chaining message authentication code (CCM) encryption mode. In another aspect, a length of the keyed hash may be compared to a required IV length for the encryption mode used to encrypt the instance of data.

For example, in response to determining that a length of the keyed hash is equal to the minimum required (to make the chance of hash collision sufficiently negligible) IV length for the encryption mode, the keyed hash may be used as the IV to perform encryption utilizing the encryption mode. In another example, in response to determining that a length of the keyed hash is greater than the required IV length for the encryption mode, a predetermined subset of the keyed hash (e.g., the first bytes of it, for a predetermined length, etc.) may be used to perform encryption utilizing the encryption mode.

Also, in one aspect, the instance of data may be compressed before being encrypted. In another aspect, the encrypted instance of data may include an instance of ciphertext (e.g., encrypted text resulting from applying an encryption algorithm to plaintext, etc.).

Further, method 500 may proceed with operation 506, where the IV and the encrypted instance of data are combined to create a ciphertext string. In one aspect, the IV may be concatenated to the encrypted instance of data to create the ciphertext string. In another aspect, the IV may be added as metadata to the encrypted instance of data. In yet another aspect, the IV and the encrypted instance of data may be combined into a single data chunk that is parsed upon performing a read operation.

Further still, in one aspect, length preserving compression (LPC) may be implemented utilizing the encrypted instance of data and the IV. For example, the instance of data may be compressed before being encrypted to create an encrypted compressed instance of data. In another example, a length value indicating a length of the encrypted compressed instance of data, the encrypted compressed instance of data, and a zero pad field (a highly compressible and readily detectable pattern such as all zeroes) may be concatenated in any predetermined (or self-describing) order to create a ciphertext string with a length that is the same as a length of the original instance of data before compression.

Also, in one aspect, LPC may be extended to enable deduplication. For example, the instance of data may be compressed before being encrypted to create an encrypted compressed instance of data. In another example, the IV (created utilizing the compressed instance of data and the secret key), the MAC (created utilizing the compressed instance of data and the secret key), a length value indicating a length of the encrypted compressed instance of data, and/or a zero pad field may be appended to the encrypted compressed instance of data to create a ciphertext string with a length that is the same as a length of the original instance of data before compression.

Further, method 500 may proceed with operation 508, where the ciphertext string is sent to a storage device performing deduplication. In one aspect, the ciphertext string the storage device may include a database, a distributed storage system, a cloud computing environment, etc. In another example, the ciphertext string may be sent via one or more networks to one or more users, one or more devices, one or more remote storage systems, etc. Further, data deduplication may be performed within the storage device.

In this way, a fully deterministic ciphertext string may be created and stored for the instance of data. The ciphertext string is fully deterministic in that, using the above techniques, a first ciphertext string created for a first instance of data using a first key may be identical to a second ciphertext string created for a second instance of data using a second key if the first instance of data is identical to the second instance of data and the first key is identical to the second key. As a result, duplicate ciphertext strings may be identified within hardware storage and may be removed, thereby increasing available storage space within the hardware storage, and improving the effective storage capacity and performance of the hardware storage, while maintaining the security of the stored data via robust encryption.

More specifically, since both the IV and the encrypted instance of data are calculated with a secret key, security vulnerability is avoided.

Figure 6:
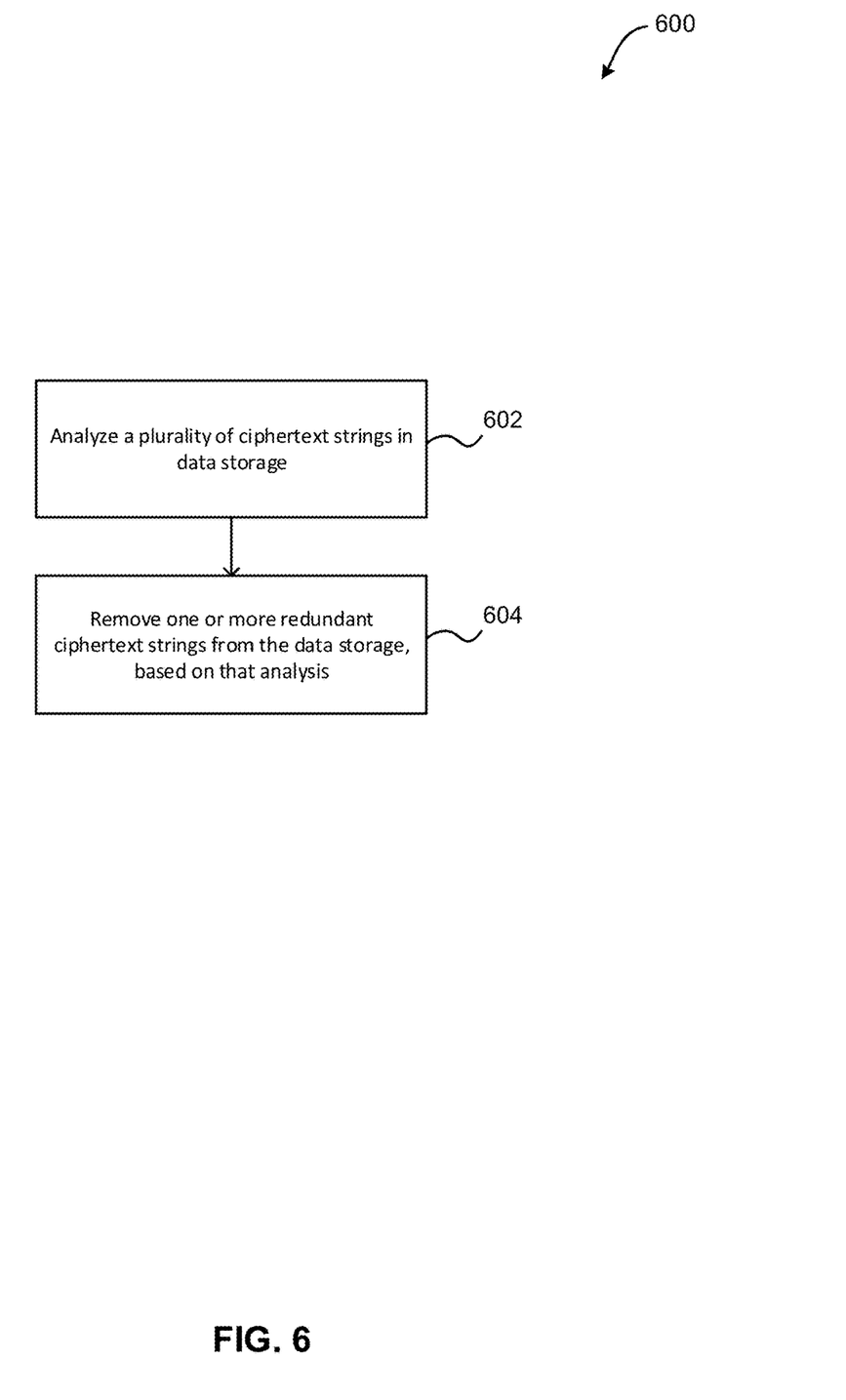
FIG. 6 illustrates a flowchart of a method for performing data deduplication, in accordance with one aspect of the present invention.

Now referring to FIG. 6, a flowchart of a method 600 for performing data deduplication is shown according to one aspect. The method 600 may be performed in accordance with the present invention in any of the environments depicted in FIGS. 1-4, among others, in various aspects. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art. Additional exemplary components include one or more co-processors or accelerators which may or may not be on the same chip, or packaged on the same substrate or module, as the CPU.

As shown in FIG. 6, method 600 may initiate with operation 602, where a plurality of ciphertext strings in data storage are analyzed. In one aspect, the data storage may include a database, a distributed storage system, a cloud computing environment, etc. In another aspect, the analysis may include comparing a single ciphertext string within the data storage to other ciphertext strings within the data storage to determine if any matches (e.g., duplicates) exist within the data storage. If so, one of the two instances may be replaced by a pointer to the duplicate instance achieving data deduplication.

In yet another aspect, each of the plurality of ciphertext strings may be created by combining an IV and an encrypted instance of data. In another aspect, the encrypted instance of data may be encrypted utilizing the IV, a secret key, and an instance of data. In yet another aspect, the IV may be created utilizing the instance of data and the secret key.

Additionally, in one aspect, a portion of a single ciphertext string may be compared to portions of other ciphertext strings within the data storage. For example, the ciphertext string may include an IV concatenated to an encrypted instance of data. In another example, the IV may have a predetermined size, and may be extracted from the ciphertext string and compared to other IVs extracted from other stored ciphertext strings.

Further, method 600 may proceed with operation 604, where one or more redundant ciphertext strings are removed from the data storage, based on that analysis. In one aspect, in response to determining that one or more matches/duplicates are found for a given ciphertext string within the data storage, one or more instances of the given ciphertext string may be removed (e.g., deleted, migrated, etc.) from the data storage and replaced with pointers to instances that are retained. In another aspect, duplicate ciphertext strings may be removed from the data storage such that a single instance of the ciphertext string remains in the data storage.

As a result, deduplication may be performed within the data storage, which may maximize the effective amount of available storage space within the data storage, thereby improving the storage capacity of the data storage.

Figure 7:
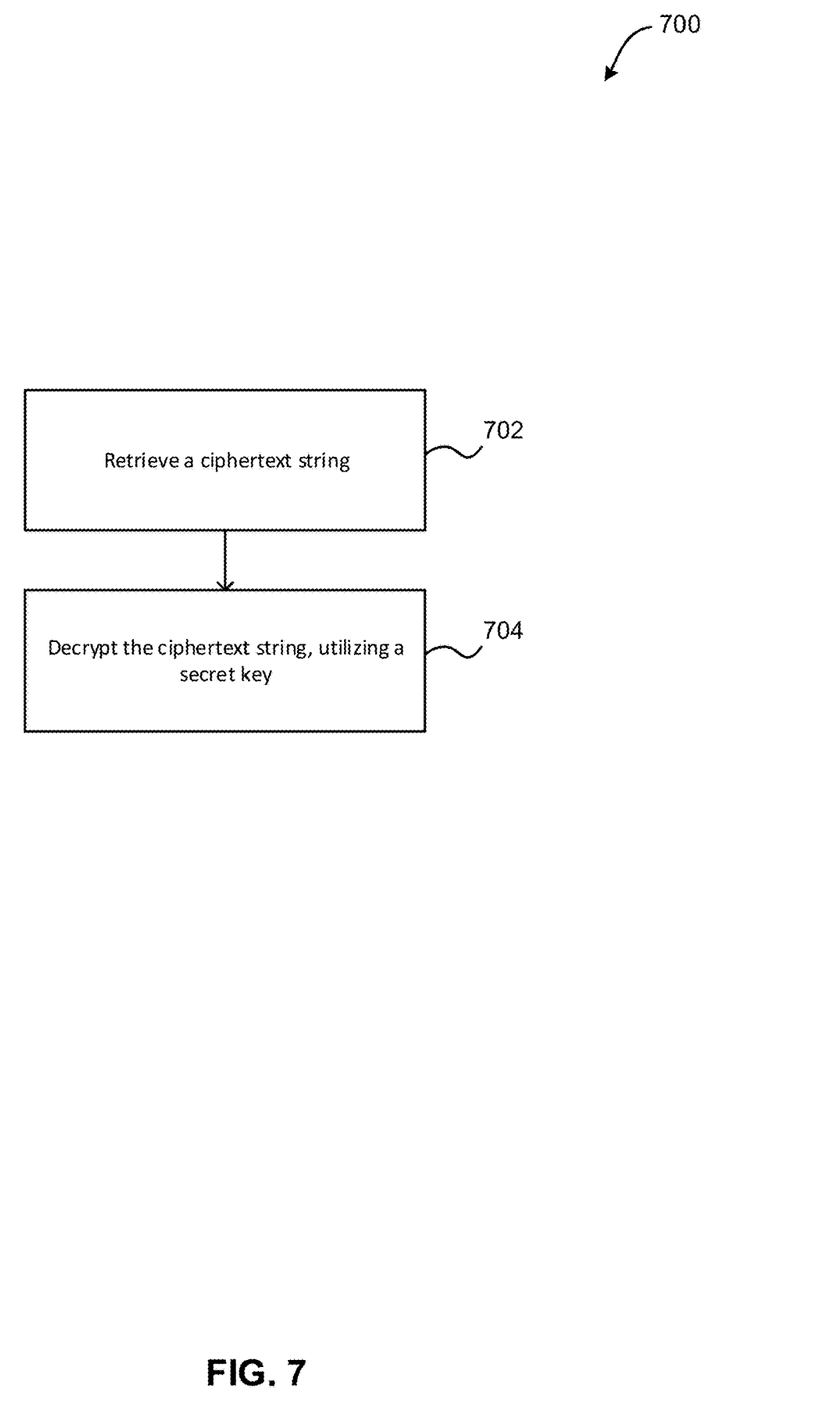
FIG. 7 illustrates a flowchart of a method for performing data decryption, in accordance with one aspect of the present invention.

Now referring to FIG. 7, a flowchart of a method 700 for performing data decryption is shown according to one aspect. The method 700 may be performed in accordance with the present invention in any of the environments depicted in FIGS. 1-4, among others, in various aspects. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various aspects, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art. Additional exemplary components include one or more co-processors or accelerators which may or may not be on the same chip, or packaged on the same substrate or module, as the CPU.

As shown in FIG. 7, method 700 may initiate with operation 702, where a ciphertext string is received. In one aspect, the ciphertext string may be retrieved from data storage (e.g., a database, a distributed storage system, a cloud computing environment, etc.).

Additionally, method 700 may proceed with operation 704, where the ciphertext string is decrypted utilizing a secret key. In one aspect, if the ciphertext string includes a MAC, the MAC may be checked to see if it is valid. In another aspect, if the MAC is invalid, the ciphertext may be decrypted using the secret key.

In another aspect, the ciphertext string may be created by combining an IV and an encrypted instance of data. In another aspect, the encrypted instance of data may be encrypted utilizing the IV, a secret key, and an instance of data. In yet another aspect, the IV may be created utilizing the instance of data and the secret key.

Further, in one aspect, decrypting the ciphertext string may yield an instance of data as well as a first IV. In another aspect, decrypting the ciphertext string may include decrypting the IV within the ciphertext, utilizing the secret key and the IV.

Further still, in one aspect, decrypting the ciphertext string may include reversing the steps used by an encryption mode to encrypt the instance of data. In another embodiment, the first two steps in decryption of a sector may include parsing the ciphertext string to detect if the ciphertext string includes a zero pad field of sufficient length in a known place in the sector (e.g., a first or last field). Depending on the predetermined order of the fields, the zero pad, if present, is potentially detectable before the rest of the sector is parsed. In another aspect, a second IV may be calculated utilizing the instance of data and the secret key.

Also, in one aspect, the first IV may be compared to the second IV to determine if the ciphertext string was modified. For example, if the first IV matches the second IV, it may be determined that the ciphertext string was not modified after it was created. In another example, if the first IV does not match the second IV, it may be determined that the ciphertext string was corrupted or modified after it was created.

Resilient Deterministic Encryption

Length Preserving Compression (LPC) is a concept, if properly extended, that holds promise as a way to enable a storage system to perform data deduplication of data that was already persistently encrypted at the host. With that said, an overly simplistic approach to LPC implementation could lead to a system which is easily broken by a known attack. A deterministic encryption solution is therefore provided which improves on two other types of deterministic encryption which are vulnerable to such attacks. This solution may be thought of as a derivative of convergent encryption.

Current implementations are not secure against certain attacks. For example, a largely fixed form being filled out with a limited number of inputs may create a limited number of IVs (and thus ciphertexts) which could then all be generated by an attacker and compared to the IV (or full ciphertext) created by convergent encryption. If there is a match, the plaintext may be determined.

A conceptually similar encryption concept (that is different in implementation) has also been called convergent encryption. This implementation calls for a simple hash of the plaintext to instead be used as an IV for a counter-mode based encryption (e.g., counter (CTR) encryption, Galois/Counter Mode (GCM) encryption, etc.). This concept is a form of deterministic encryption that is also vulnerable to attack.

A method is therefore provided that enables convergent encryption without vulnerability to the attack noted above. This method uses a keyed hash as the IV. This keyed hash could be a hash calculated across the data and a hashing key, an HMAC calculated based on the data and hashing key, or an encryption (e.g., using electronic codebook (ECB) encryption, etc.) of a simple cryptographic hash of the plaintext data. The hashing key might have a key derivation relationship with the key used to encrypt host data, or may be generated independently of it. The keyed hash, or a subset of it, is then used, during encryption, as the IV. This IV which will typically (e.g., in the case of LPC) be sent along with the resultant ciphertext.

By inclusion of a hashing key, which has high entropy independent of the host data, in the calculation of the keyed hash (which is used as the IV), this implementation eliminates the above vulnerability since both the IV and the resultant ciphertext are cryptographically created with secret keys the attacker does not have. This new implementation is called resilient deterministic encryption (RDE).

Encryption

For encryption of plaintext P with RDE using a secret key Kd, one exemplary aspect would include creating a keyed hash (e.g., based on Kd) and then using that keyed hash as the initialization vector (IV) for an encryption mode which uses both IV and Kd.

In one aspect, Kd may be associated with a specific tenant as part of a secure multi-tenant solution. In another aspect, Kd may be associated with a subset of users and/or applications (e.g. human resources, finance, etc.) within a given tenant's operations.

The generation of one type of keyed hash Hk is described below:

$$Hk=\text{hash}(Kd\|P)$$

Examples of suitable cryptographic 'hash' functions would be SHA2-256, SHA3-256, or another standardized cryptographic hash. The generation of the encrypted result CX is described below:

$$CX=\text{encrypt\_data}(Kd,Hk,P)$$

The 'encrypt_data' function might be CTR (key, IV, plaintext) encryption, GCM if a message authentication code (MAC) is to be created and appended as well, or other cryptographic mode requiring an IV or nonce.

If the 'hash' function output is larger than the IV required, or that the selected encryption mode will accept, then a subset of the hash may be used. For example, the IV may be set to the first twelve (or sixteen, depending on the need) bytes out of a thirty-two byte SHA-256 output. The resultant CX of the counter mode includes the IV concatenated with the ciphertext of P. If an authenticated encryption mode such as GCM is used, the CX includes the trailing MAC (e.g. the GCM-MAC) as well. In either case the CX is longer (e.g., by the IV at a minimum, and possibly by a MAC as well) than the P being encrypted.

Storage/Transmission

After generating the encrypted result CX, CX is transmitted or stored. CX, as constructed, is fully deterministic for any given combination of secret key (Kd) and plaintext (P), which allows different ciphertext strings (CXs) created from different instances of identical plaintext to be deduplicated against one another.

Decryption

The decryption of the encrypted result CX using the secret key Kd to obtain the initialization vector IV and the plaintext P is described below:

decrypt_data(Kd,CX)=>IV and P

In one aspect, if an authenticated mode such as GCM was used for encryption, the values of IV and P are only passed on or trusted as valid in response to determining that the integrated MAC has been confirmed as valid.

In another aspect, the IV may be used to confirm that nothing in the encrypted result CX was modified. More specifically, given the secret key Kd and the plaintext P, the receiver/reader of the encrypted result CX is able to calculate the keyed hash of the secret key Kd and the plaintext P (e.g., hash (Kd||P)) to see if it matches the IV that is received. If the calculated hash matches the IV, the integrity of the encrypted result CX may be confirmed.

In the case where the encryption mode used is not authenticated (e.g., standard CTR or CBC), this integrity check may act as a type of MAC calculated on plaintext and applied before encryption, which is secure if an appropriate encryption mode is used.

Additional Aspects

In one aspect, an order of the hash calculation may be adjusted. For example, the generation of the keyed hash Hk using an alternate order is described below:

Hk=hash(P||Kd)

In general, the secret key Kd and plaintext P may be put into the hash function in any order.

In another aspect, a keyed hash may be calculated by encryption of a hash. For example, an additional key Kh may be derived from the secret key Kd. The keyed hash Hk may then be calculated by the following process:

encrypt_hash(Kh,hash(P)), where 'encrypt_hash' may include an electronic codebook (ECB) advanced encryption standard (AES) such as:

ECB_AES_128_encrypt(key,hash(P)).

In another aspect, the additional key Kh may be generated independently of the secret key Kd, and both the secret key Kd and the additional key Kh must be kept to enable the decryption of the encrypted result CX.

In one aspect, a method for the deterministic encryption of data includes creating (as a form of keyed hash) an encrypted hash of the data and employing the encrypted hash (or a subset of it) as the IV for encrypting data. In another aspect, the hashing key used to create the IV and the encryption key used to encrypt host data are distinct from one another.

Additionally, in one aspect, the length of the encrypted IV and the hash is adjusted by utilizing a first portion of the encrypted hash as the IV. In another aspect, the IV and the data are decrypted, a hash of the decrypted data is determined, and the hash is compared to the IV to ensure that the data has not been altered.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), programmable logic arrays (PLA), hardware accelerators, or co-processors may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various aspects may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc. Additional exemplary processors include one or more co-processors or accelerators which may or may not be on the same chip, or packaged on the same substrate or module, as the CPU.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method, comprising:
creating an initialization vector, utilizing an instance of plaintext and a secret key;
encrypting the instance of plaintext, utilizing the initialization vector, the secret key, and the instance of plaintext;
combining the initialization vector and the encrypted instance of plaintext to create a ciphertext string; and
outputting the ciphertext string.

2. The computer-implemented method of claim 1, wherein the initialization vector is added as metadata to the encrypted instance of plaintext.

3. The computer-implemented method of claim 1, wherein the initialization vector and the encrypted instance of plaintext are combined into a single data chunk that is parsed upon performing a read operation.

4. The computer-implemented method of claim 1, wherein the instance of plaintext is compressed, and the initialization vector is created based on the compressed instance of plaintext.

5. The computer-implemented method of claim 1, wherein the initialization vector includes a keyed hash resulting from applying a hash function across the secret key and the instance of plaintext in a known order.

6. The computer-implemented method of claim 1, wherein a key for hashing is associated with the secret key by key derivation, and the initialization vector includes a keyed hash that is calculated using an encryption algorithm and the key for hashing.

7. The computer-implemented method of claim 1, wherein a key for hashing is generated independently of the secret key, and the initialization vector includes a keyed hash that is calculated using an encryption algorithm and the key for hashing.

8. The computer-implemented method of claim 1, wherein encrypting the instance of plaintext includes applying an encryption mode to the instance of plaintext, utilizing the initialization vector and the secret key.

9. The computer-implemented method of claim 1, wherein a length of the initialization vector is compared to a required initialization vector length for an encryption mode used to encrypt the instance of plaintext, and:
   in response to determining that a length of the initialization vector is less than or equal to the required initialization vector length for the encryption mode, the initialization vector is used to perform encryption utilizing the encryption mode, and
   in response to determining that a length of the initialization vector is greater than the required initialization vector length for the encryption mode, a subset of the initialization vector is used to perform encryption utilizing the encryption mode.

10. The computer-implemented method of claim 1, wherein the instance of plaintext is compressed before being encrypted.

11. The computer-implemented method of claim 1, wherein the initialization vector is concatenated to the encrypted instance of plaintext to create the ciphertext string.

12. A computer program product for implementing resilient deterministic encryption, the computer program product comprising a computer readable storage medium having program instructions embodied therewith, the program instructions executable by a processor to cause the processor to perform a method comprising:
   creating, by the processor, an initialization vector, utilizing an instance of plaintext and a secret key;
   encrypting, by the processor, the instance of plaintext, utilizing the initialization vector, the secret key, and the instance of plaintext;
   combining, by the processor, the initialization vector and the encrypted instance of plaintext to create a ciphertext string; and
   outputting, by the processor, the ciphertext string.

13. The computer program product of claim 12, wherein the initialization vector is added as metadata to the encrypted instance of plaintext.

14. The computer program product of claim 12, wherein the initialization vector and the encrypted instance of plaintext are combined into a single data chunk that is parsed upon performing a read operation.

15. The computer program product of claim 12, wherein the instance of plaintext is compressed, and the initialization vector is created based on the compressed instance of plaintext.

16. The computer program product of claim 12, wherein the initialization vector includes a keyed hash resulting from applying a hash function first to the secret key and then to the instance of plaintext.

17. The computer program product of claim 12, wherein the initialization vector includes a keyed hash resulting from applying a hash function across the secret key and the instance of plaintext in a known order.

18. The computer program product of claim 12, wherein a key for hashing is associated with the secret key by key derivation, and the initialization vector includes a keyed hash that is calculated using an encryption algorithm and the key for hashing.

19. The computer program product of claim 12, wherein a key for hashing is generated independently of the secret key, and the initialization vector includes a keyed hash that is calculated using an encryption algorithm and the key for hashing.

20. The computer program product of claim 12, wherein encrypting the instance of plaintext includes applying an encryption mode to the instance of plaintext, utilizing the initialization vector and the secret key.

21. The computer program product of claim 12, wherein a length of the initialization vector is compared to a required initialization vector length for an encryption mode used to encrypt the instance of plaintext, and:
   in response to determining that a length of the initialization vector is less than or equal to the required initialization vector length for the encryption mode, the initialization vector is used to perform encryption utilizing the encryption mode, and
   in response to determining that a length of the initialization vector is greater than the required initialization vector length for the encryption mode, a subset of the initialization vector is used to perform encryption utilizing the encryption mode.

22. The computer program product of claim 12, wherein the instance of plaintext is compressed before being encrypted.

23. The computer program product of claim 12, wherein the initialization vector is concatenated to the encrypted instance of plaintext to create the ciphertext string.

24. A system, comprising:
   a processor; and
   logic integrated with the processor, executable by the processor, or integrated with and executable by the processor, the logic being configured to:
   create an initialization vector, utilizing an instance of plaintext and a secret key;
   encrypt the instance of plaintext, utilizing the initialization vector, the secret key, and the instance of plaintext;
   combine the initialization vector and the encrypted instance of plaintext to create a ciphertext string; and
   output the ciphertext string.

25. A computer-implemented method, comprising:
   analyzing a plurality of ciphertext strings in data storage, wherein:
      each of the ciphertext strings is created by combining an initialization vector and an encrypted instance of plaintext,
      the encrypted instance of plaintext is encrypted utilizing the initialization vector, a secret key, and an instance of plaintext, and
      the initialization vector is created utilizing the instance of plaintext and the secret key; and
   removing one or more redundant ciphertext strings from the data storage, based on the analyzing.

\* \* \* \* \*